Nov. 14, 1967   J. C. FISK   3,352,022
UPRIGHT GRINDING GAUGE
Filed Oct. 11, 1965   6 Sheets-Sheet 3
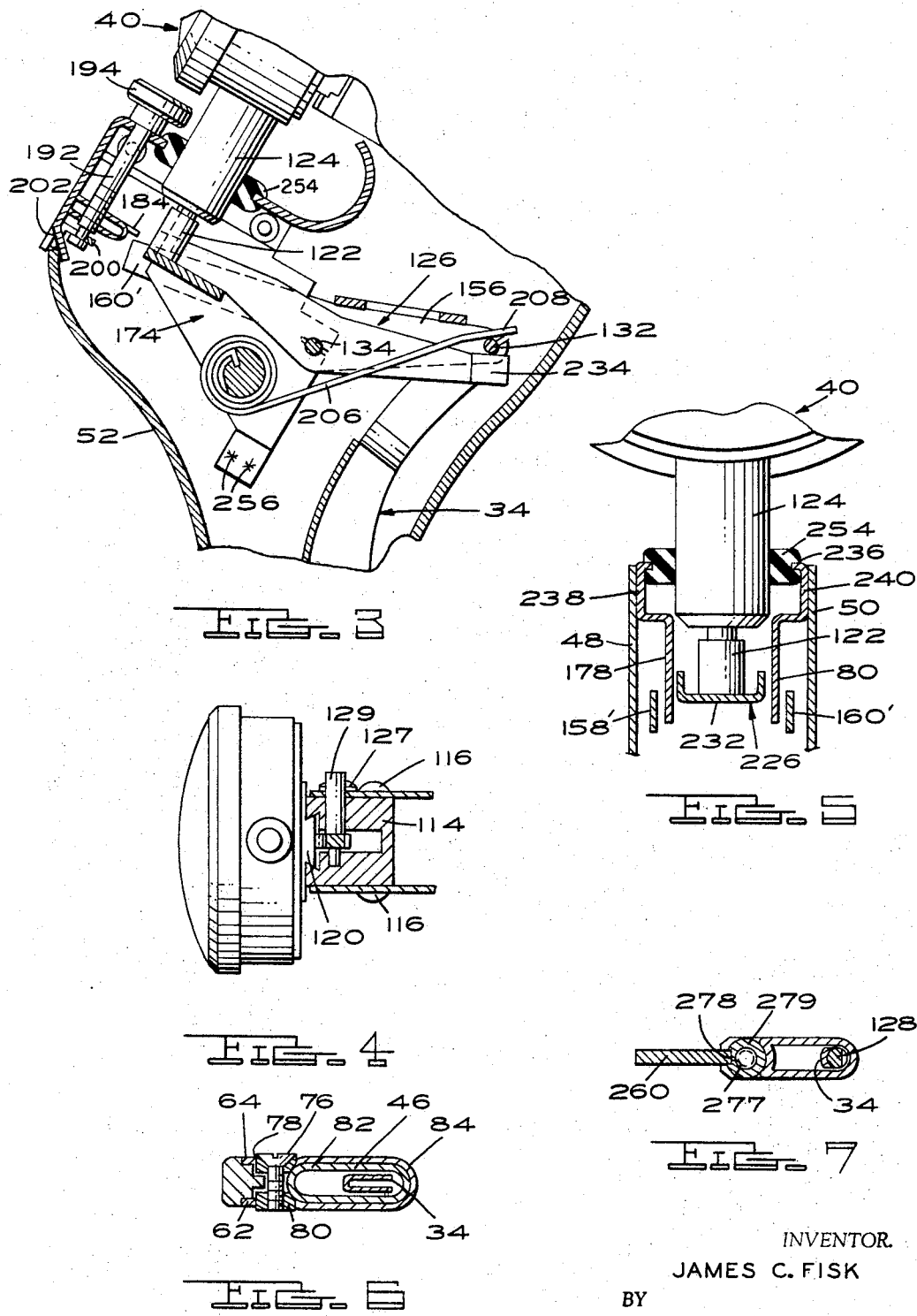
INVENTOR.
JAMES C. FISK
BY
Burton & Parker
ATTORNEYS

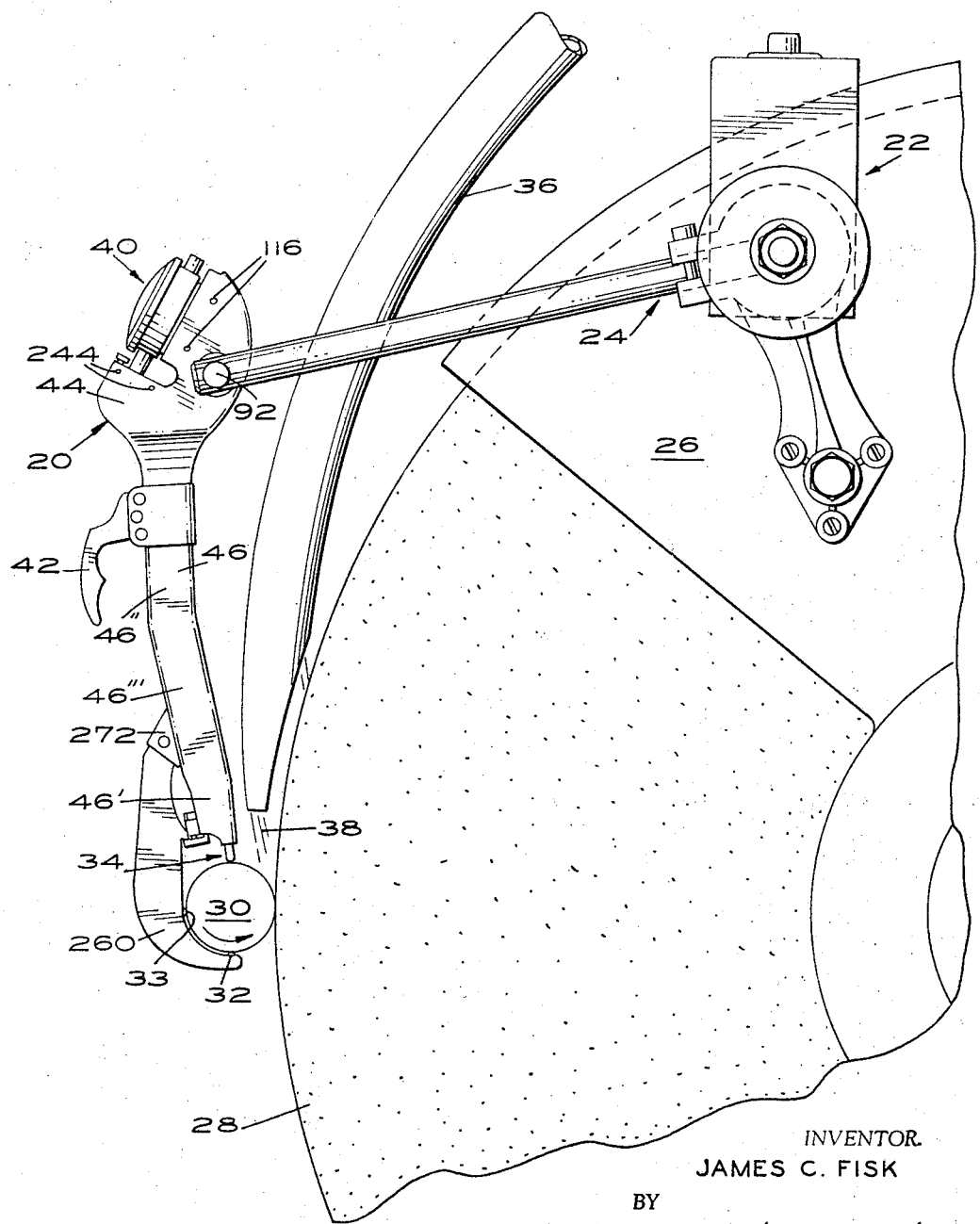

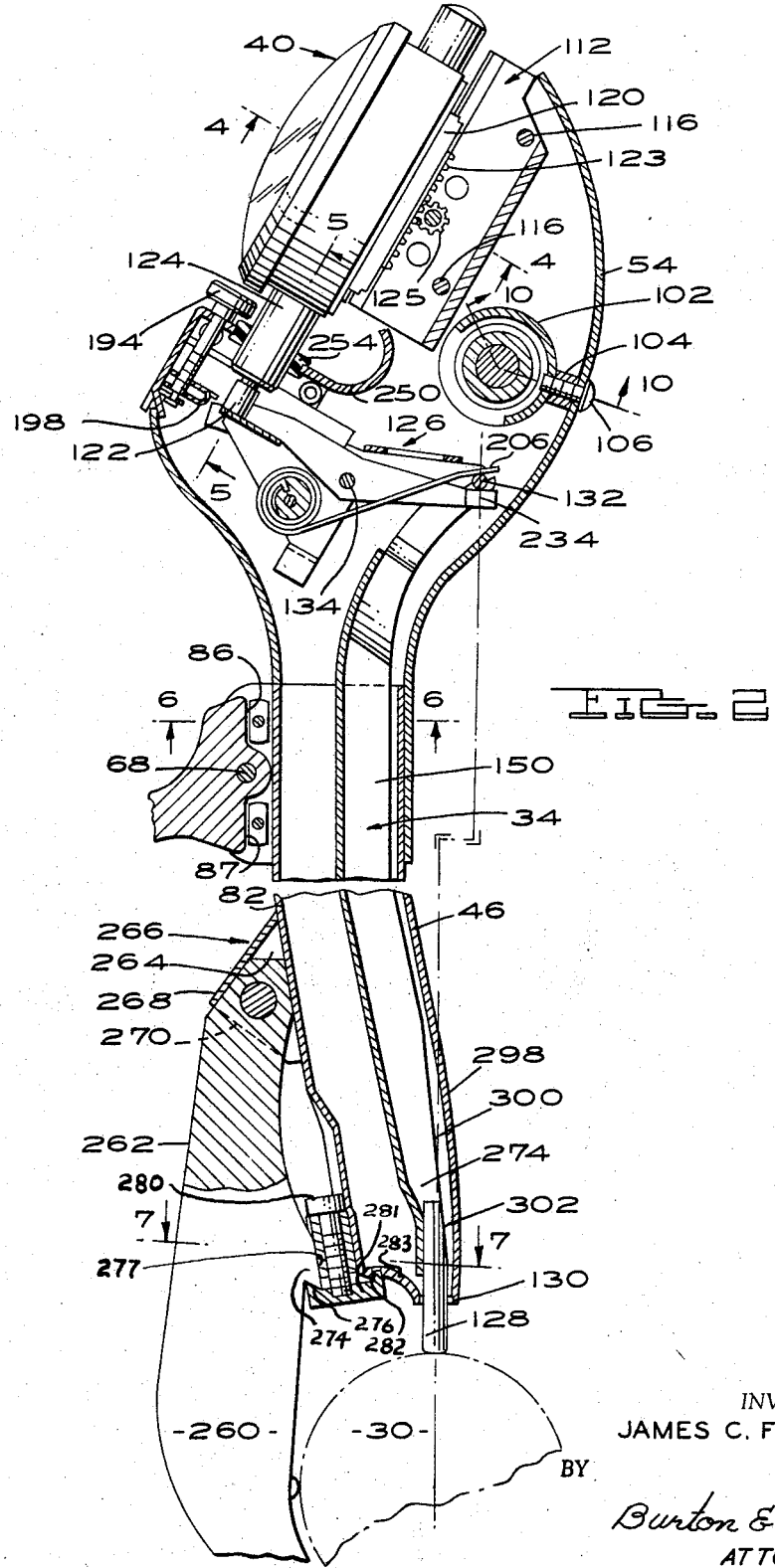

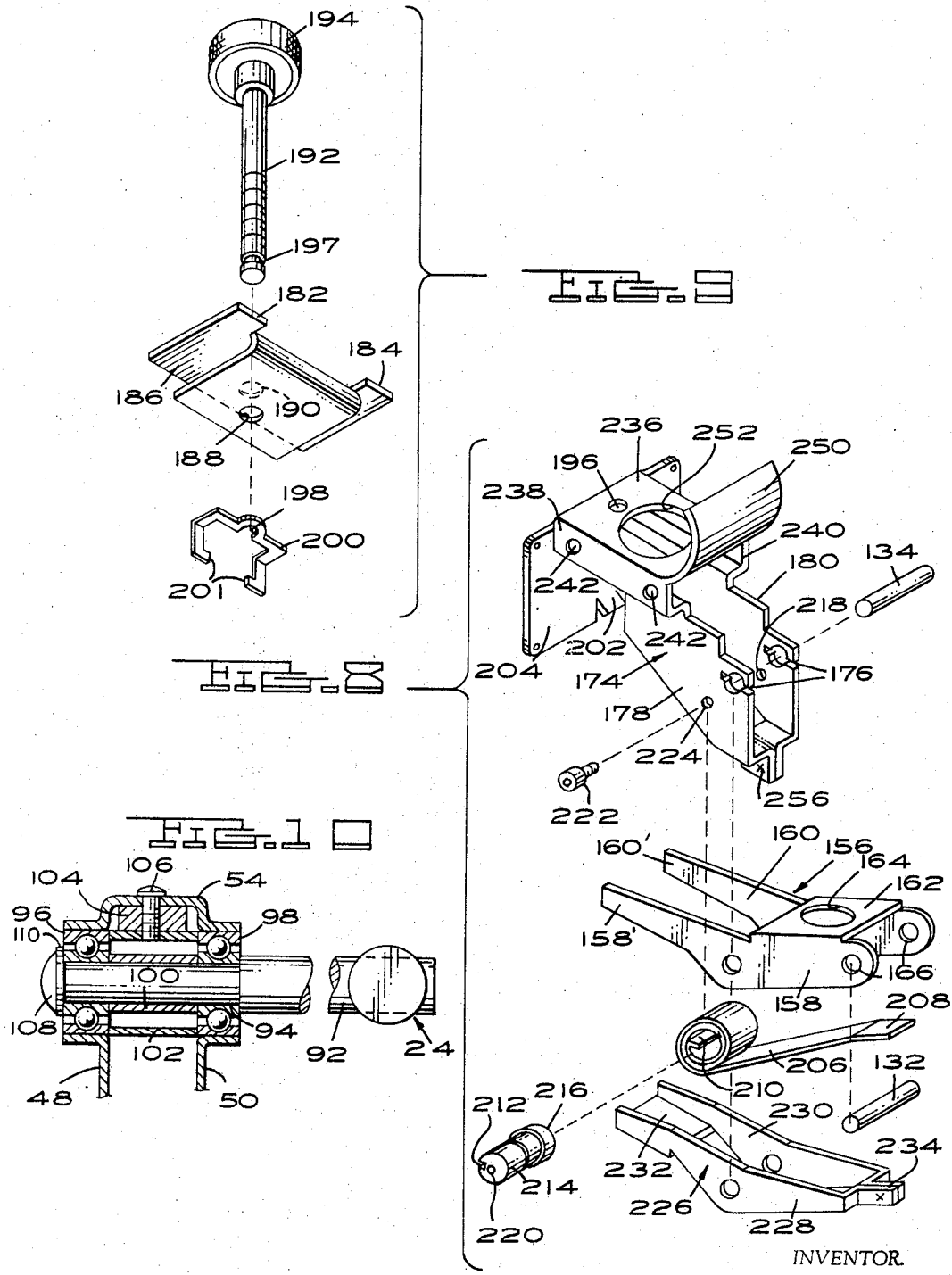

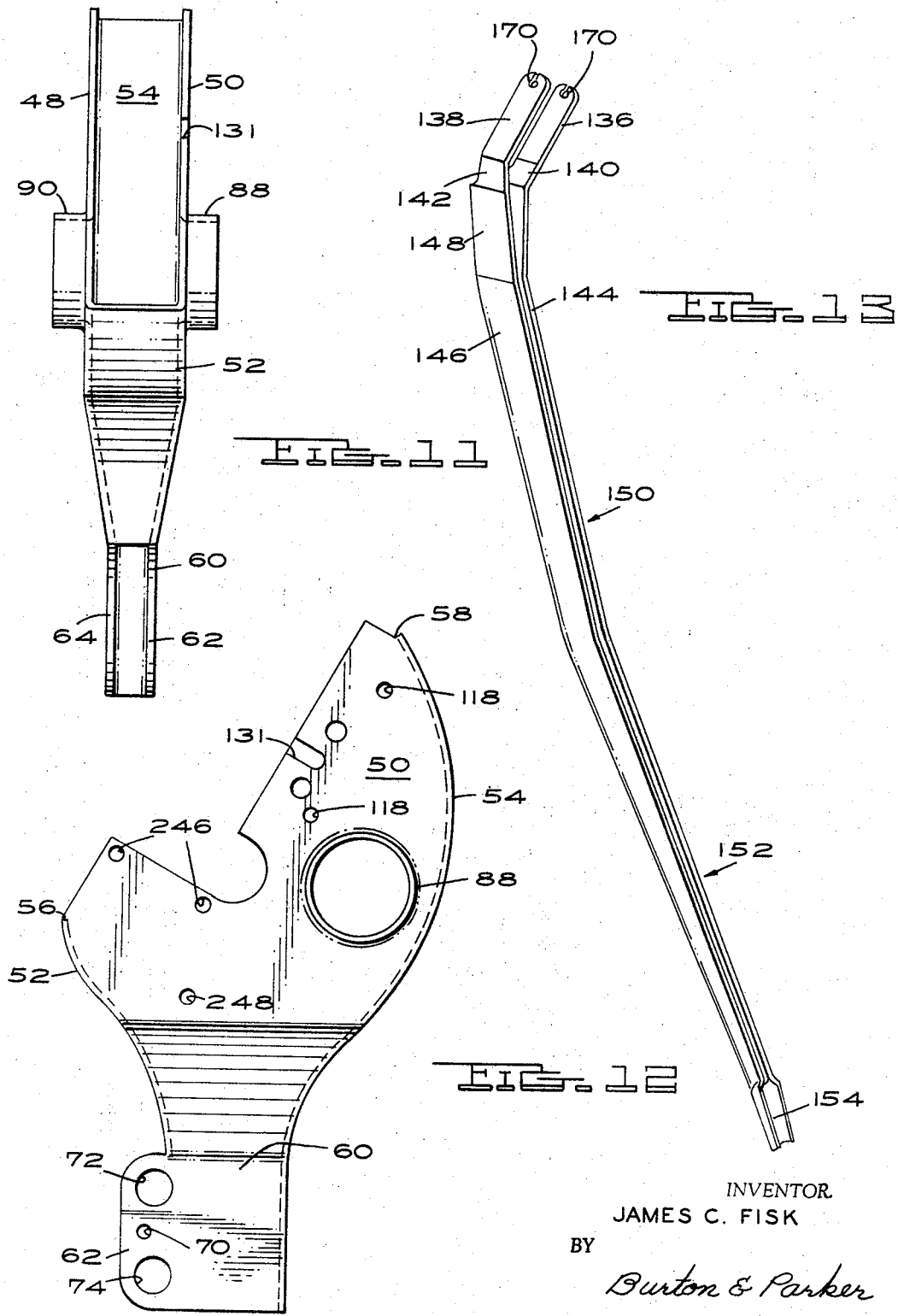

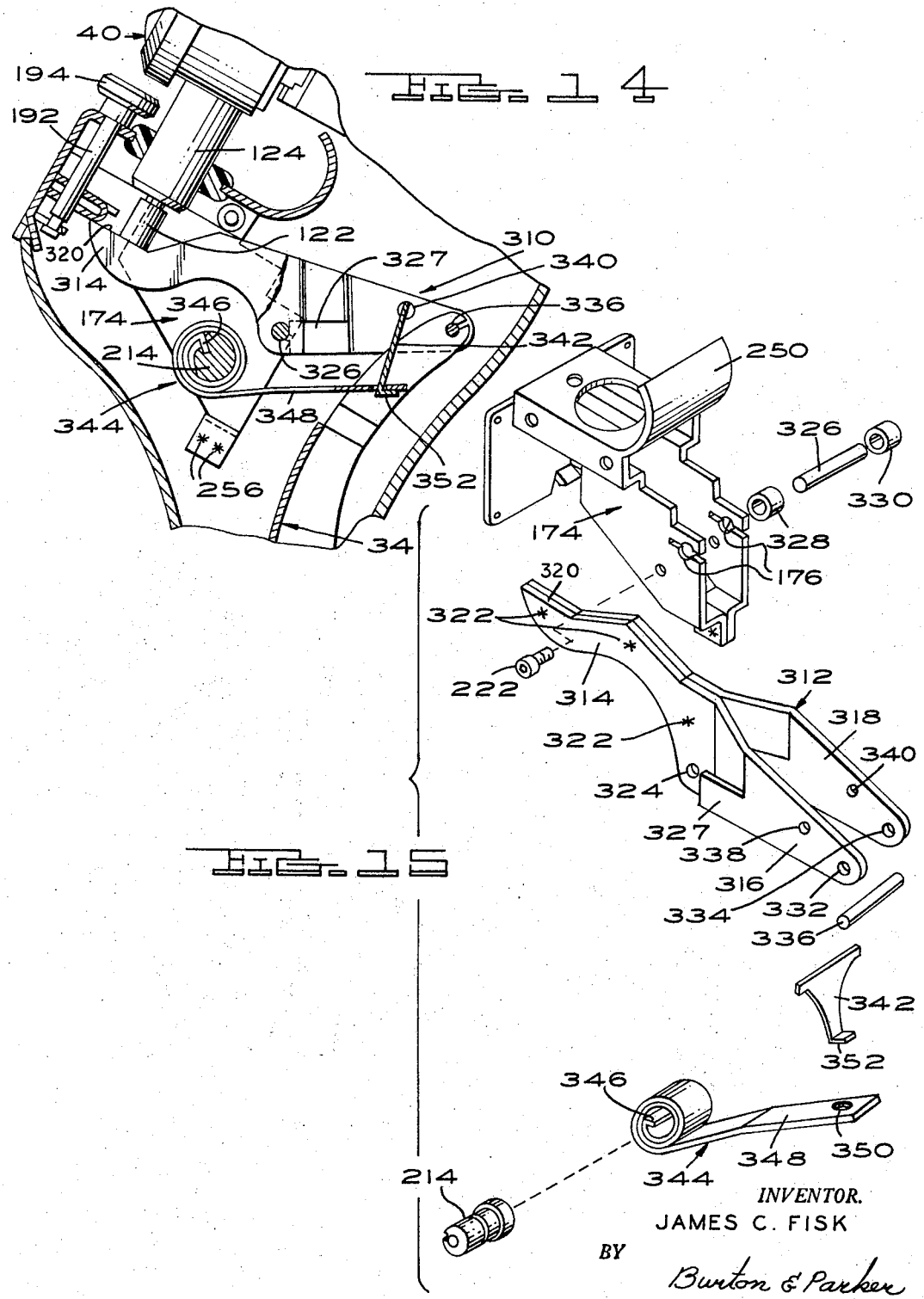

United States Patent Office 3,352,022
Patented Nov. 14, 1967

3,352,022
UPRIGHT GRINDING GAUGE
James C. Fisk, G-3219 E. Bristol Road,
Flint, Mich. 48507
Filed Oct. 11, 1965, Ser. No. 494,852
25 Claims. (Cl. 33—178)

ABSTRACT OF THE DISCLOSURE

An upright grinding gauge for mounting on a swingable support for movement into and out of contact with a workpiece to effect a gauging function, the gauge including an upright body carrying a dial indicator at its upper end and a caliper for releasably connecting the gauge to the workpiece at its lower end, and mechanism within the gauge body for sensing variations in the workpiece and transmitting such variations to the dial indicator. The gauge body is advantageously fabricated to a great extent of metal stampings of sturdy yet lightweight construction, and employing an actuating mechanism for the dial indicator including a first class lever designed for fidelity of performance of the gauge, yet of inexpensive fabrication.

---

This application is a continuation-in-part of my copending application Serial No. 380,253 filed July 6, 1964, now abandoned.

This invention relates to improvements in upright grinding gauges and the like.

Gauges of this type are generally mounted on the grinder, or other machine tool, by some suitable support and may be swung on such support into contact with a workpiece to effect a gauging function and swung away from the workpiece at completion of the gauging function. The gauge generally comprises an upright frame having at its upper end a head carrying a dial indicator or other dimension indicating or registering means, and at its lower end a caliper for releasably connecting the gauge to the workpiece, with a contact bearing against the workpiece to sense variation in its diameter or in other dimensions while the workpiece is being ground or otherwise machined. The conventional gauge senses variations in the diameter. The invention disclosed herein relates to the conventional type grinding gauge though it may have other special application.

An object of this invention is to provide an upright grinding gauge which is fabricated to a great extent of metal stampings and utilizes an assembly of movable parts which may be preassembled in a works bracket with the bracket and assembly then conveniently received and secured in the metal stampings to produce a less expensive gauge competitive with some foreign made gauges, and which gauge possesses as great or greater a degree of accuracy than upright grinding gauges currently in use.

Another object of the invention is the provision of an upright grinding gauge of sturdy construction yet lighter weight than grinding gauges currently in use, and which is so designed that it will allow the gauge to be more nearly vertical and yet not interfere with coolant nozzles disposed adjacent the workpiece and machine tool cutter.

Another object of the invention is the provision of an upright grinding gauge so designed that the means connecting the movable work contacting part with the indicator incorporates the correct geometry for fidelity of performance of the gauge and yet is of inexpensive fabrication.

Another object of the invention is the design of an actuating mechanism for the dial indicator, which mechanism is so arranged that the indicator may be placed in the most desirable position, i.e., upward and angularly facing, and which mechanism at the same time provides a shockproof operation of the indicator permitting overtravel of the movable work contacting part without damaging the indicator.

Another object of the invention is the provision of an indicator actuating mechanism for an upright grinding gauge which is so designed that friction in operating parts of the gauge is reduced, periodic lubrication unnecessary, and high fidelity response between variations in the size of the workpiece and indication thereof in the indicator is accomplished without necessitating expensive high precision alignment of the mechanism components.

Still another object of the invention is the provision of a mechanism for transmitting minute movements of a movable work contacting part in a grinding gauge which mechanism includes what may be termed a works bracket facilitating assembly of the parts and providing a suitable frame for holding them in accurate position relative to each other and within the gauge framework.

Other objects, advantages, and meritorious features will more fully appear from the specification, claims, and accompanying drawings wherein:

FIG. 1 is a side view of the improved grinding gauge mounted on a grinding machine, with the gauge embracing a workpiece;

FIG. 2 is a cross-sectional side elevation of the improved grinding gauge;

FIG. 3 is a fragmentary detailed side elevation of the dial indicator actuating mechanism shown in FIG. 2;

FIG. 4 is a cross-sectional view taken on the line 4—4 of FIG. 2;

FIG. 5 is a cross-sectional view taken on the line 5—5 of FIG. 2;

FIG. 6 is a cross-sectional view taken on the line 6—6 of FIG. 2;

FIG. 7 is a cross-sectional view taken on the line 7—7 of FIG. 2;

FIG. 8 is an exploded view of a portion of the actuating mechanism for the dial indicator including the works bracket and associated pivotally mounted levers;

FIG. 9 is an exploded view of another portion of the actuating mechanism whose function is hereinafter described;

FIG. 10 is a cross-sectional view taken on line 10—10 of FIG. 2;

FIG. 11 is a front view of the head of the gauge formed up of sheet metal stampings showing the same prior to assembly of other parts thereto and therein;

FIG. 12 is a side elevation of the head of FIG. 11;

FIG. 13 is a perspective view of the sheet metal portion of the plunger;

FIG. 14 is a fragmentary detailed side elevation similar to FIG. 3, showing a modified dial indicator actuating mechanism; and FIG. 15 is an exploded view similar to FIG. 8 of a portion of the actuating mechanism for the dial indicator shown in FIG. 14.

My improved gauge, indicated in FIG. 1 at 20, is shown mounted by a conventional gauge support 22 having a supporting arm 24 upon the fender or guard 26 overlying a grinding wheel 28 of a grinding machine to gauge the diameter of a workpiece 30, being ground by the wheel 28. The gauge support 22 through the arm 24 biases the gauge 20 upwardly with a light pressure so that the lower contact 32 of the caliper means at the lower end of the gauge rides the underside of the workpiece. The workpiece is supported in the grinding machine and is rotated in the direction of the arrow with the caliper means serving to keep the grinding gauge engaged upon the workpiece with the plunger 34 of the gauge riding the upper side of the workpiece diametrically opposite the contact 32. The gauge is so shaped, and this is one of its features, that a water nozzle may extend downwardly between the gauge and the grinding wheel to allow a stream of water 38 to impinge upon the wheel and workpiece at the point of contact therebetween. The design of the gauge is such that despite the interpositioning of the nozzle the gauge may still assume a substantially vertical position.

It will be observed that the gauge is provided at its upper end with a dial indicator 40 which faces forwardly and angularly upwardly so that it may be easily read by the workman. The gauge is also provided with a handle 42 by means of which the workman can remove the gauge from or position it on the workpiece. When the gauge is removed from the workpiece the support and its arm 24 will serve to swing the gauge upwardly and away from the workpiece and to a position where the workpiece can be removed from the grinder without danger of harming the gauge.

The gauge includes, in addition to the dial indicator 40, a gauge body having a head portion 44 and a barrel portion 46 which are telescoped together as shown in FIG. 2 and rigidly secured in such telescoped connection. Both the head and barrel portions are preferably formed of sheet metal which greatly contributes to the reduction in weight of the gauge with the design of such parts being such that they may be fabricated at a low cost and yet possess sufficient rigidity so that accuracy of the gauging functions is preserved during normal usage of the gauge. The head portion 44 is shown in front view in FIG. 11 and in side view in FIG. 12. It includes opposed spaced apart parallel side walls 48 and 50 which are connected together by integral relatively narrower front and rear walls 52 and 54 respectively. The front of the head portion opens forwardly between the upper edge of the front wall at 56 and the upper edge of the rear wall at 58. The interior of the head is hollow and opens downwardly through a shank portion 60 which is of more narrow configuration than the upper part of the head, as best shown in FIG. 11. The shank 60 is provided, as shown in FIGS. 6 and 12, with a pair of forwardly extending tabs 62 and 64 between which a portion of the upper end of the handle 42 extends, the same being provided with a pin 68 registering with holes 70 in the tabs to locate the handle. Each tab is also provided with a pair of openings 72 and 74, with the openings of the tabs in alignment, for reception of a screw 76 provided with a wedging washer 78 and a complementary wedging nut 80 threaded on the screw.

The upper end of the barrel 46 is telescoped into the lower end of the head, namely, within the shank portion 60 thereof, and upon tightening the screws 76, the barrel and head parts of the gauge body are rigidly locked together. It will be noted from FIG. 6 that upon tightening the screw 76, the wedging washer and wedging nut will be drawn toward each other and as their tapered surfaces bear against the forward edge of the barrel, edge 82, they will serve to displace the shank portion to the left, as viewed in FIG. 6, so that the barrel and shank will be drawn tightly together at the point of mating engagement in the area 84. This construction, it will be noted, does not serve to squeeze the tabs toward each other, thereby distorting the shank 60, but rather serves only to displace the barrel and shank relative to each other in the fashion evident from a consideration of FIG. 6. Therefore distortion by the locking of the head and barrel together will not disturb the accuracy of the gauge function.

The handle has shoulders 86 and 87 which juxtapose flats on the wedging washer and nut elements as shown in FIGS. 2 and 6 thereby preventing axial displacement of such elements out of the tabs when the barrel and head are separated and also preventing rotation of the elements to facilitate assembly of the barrel and head. The pin 68 may be headed on the outside surfaces of the tabs to prevent dislodgment and thereby insure retention of the handle.

The head and barrel portions of the gauge are preferably formed of 410 stainless steel suitably heat-treated, as for example to RC 40–45. The head portion may be blanked out and bent to the shape shown in FIGS. 11 and 12 with the front edge wall and/or rear edge wall, as desired by the fabricator, being welded in any preferred manner. The side walls 48 and 50 of the head are provided with integral outwardly extending cylindrical flanges 88 and 90 which are pressed from the metal of the side walls and receive a bearing assembly for mounting the gauge on the support rod 24.

The bearing assembly which is disposed within the cylindrical flanges 88 and 90 is best shown in FIG. 10 and includes an axle 92 undercut as at 94 with a pair of ball bearings 96 and 98 being mounted on such undercut portion and spaced apart by a pair of spacers 100 and 102, the former being a cylindrical spacer embracing the undercut and bearing at opposite ends against the bearings while the latter spacer is an incomplete cylinder as shown in FIG. 2. A small threaded block 104 is welded to the spacer 102 for threaded connection of a screw 106 extending through the rear wall 54 of the head to lock the bearing assembly within the head against lateral displacement. The end of the undercut of the axle 92 may be provided with a screw 108 threaded into the axle with a washer 110 underlying the head of such screw and abutting against the bearing 96.

With the flanges 88 and 90 extending outwardly and in opposite directions as shown in FIGS. 10 and 11, the bearings 96 and 98 are spaced sufficiently far apart so as to provide a wide "base" for preventing lateral tilting of the gauge upon its supporting axle 92. The supporting axle 92 is received in a cross-drilled hole in the outer end of arm 24 and secured therein in any suitable fashion.

The dial indicator 40, which is of conventional construction, is mounted on the head of the gauge at the top of the head and opposite the barrel 46. Dial indicator mounting means are provided at the top of the head on the side thereof opposite the barrel, which means are generally indicated at 112 in FIG. 2. Such means are shown herein as being adjustable to allow for accurate positioning of the dial indicator and may be of the type disclosed in U.S. Patent No. 3,032,309 and need not be described in detail herein. Suffice it to say that such means includes a guideway 114 which is secured to and between the side walls 48 and 50 of the head by suitable screws or the like 116 which pass through apertures 118 in such side walls. The guideway element 114 is provided with a guideway channel within which is received a complementally shaped element 120 which is secured to the back of the dial indicator. Element 120 is provided with a rack 123 with which a pinion 125 meshes. Means 12 serves to lock the element 120 against unintentional movement in the guideway channel following its accurate positioning by rotation of the pinion. The pinion is mounted on a suitable pinion shaft 129 which extends outwardly through an aperture 131 in the side wall 50 of the head.

The dial indicator is provided with a downwardly extending actuating finger 122 which is adapted to reciprocate and upon reciprocation to shift the dial indicator hand over the face of the indicator. Neither the dial indicator face nor hand are shown as such are conventional and widely understood. The dial indicator is provided with a downwardly extending cylindrical portion 124 through which the finger 122 extends and below which the outer end of the finger is disposed as shown in FIGS. 3 and 5. Finger 122 abuts the end of a first class lever actuating assembly generally indicated at 126 in FIGS. 2 and 3. The opposite end of such lever assembly is connected to the upper end of the gauge plunger 34 such that upon upward and downward movements of the plunger sensing variations in workpieces, the dial indicator finger will be shifted to cause movement of the hand of the dial indicator and a reading of a dimension of the workpiece, in the embodiment and application herein shown, such dimension being the diameter of the workpiece.

The plunger 34 is provided at the lower end with a cylindrical contact 128 which is adapted to ride the workpiece 30. Upon variations in the dimension of the workpiece the cylindrical contact 128 moves axially, being supported in a bearing 130 in the lower end of the barrel 46. The axis of the reciprocal motion of the cylindrical contact 128 substantially intersects the point of connection of the upper end of the plunger 34 with the first class lever arm assembly at 132. An imaginary line drawn along the axis of reciprocal motion of the contact 128 extending substantially through the connection 132 with the first class lever arm assembly would be substantially tangent to a circle whose center is at the pivotal center of the first class lever arm assembly 126 which is at the mounting pin 134. The path of reciprocal motion of the dial indicator finger 122 also lies substantially tangent to a circle whose center is coincident with the center of pivotal movement of the first class lever arm assembly 126, namely, coincident with the mounting pin 134. The distance from finger 122 to the pin 134 is preferably equal to the distance between pins 134 and 132, thereby insuring unit ratio between movement of contact 128 and finger 122. As a consequence of this geometry a high degree of fidelity of performance of the gauge is achieved.

It will be noted that the gauge is offset forwardly or to the front at the upper end, i.e., toward the machine operator, and at the lower end is offset rearwardly, i.e., toward the grinding wheel. As a consequence the water nozzle may be interposed between the wheel and gauge without interfering with operation of the gauge and while allowing the gauge to assume a substantially vertical position. This double offset is most noticeable in FIG. 1 where the upper end of the barrel is offset forwardly in the area indicated by the reference numeral 46, while the lower end of the barrel is offset rearwardly in the area indicated at 46′. In order to dispose the point of pivotal connection between the gauge plunger and the lever arm assembly, i.e., at connection 132, substantially directly above the contact 128, it is necessary that the rear end of the head portion extends rearwardly as shown in FIG. 1.

In order to provide for actuating the dial indicator through the interior of a double offset barrel by means of a rigid plunger, the plunger is of the configuration shown in FIG. 13. It comprises an elongated strut of sheet metal which has been folded lengthwise into a channel shape and provided at its upper end with a pair of laterally spaced apart ears 136 and 138 which are parallel and are integral with the body of the plunger and through tapered sections 140 and 142 are connected to the channel configuration proper of the plunger. The plunger side walls 144 and 146 taper toward each other in the area 148 and therebelow extend generally parallel to the contact connecting lower end of the plunger. In FIG. 2 it will be noted that the ears 136 and 138 extend rearwardly from a vertically disposed central portion 150 of the plunger with the lower portion 152 of the plunger extending downwardly and rearwardly at an angle to the central portion 150. At the lower extremity of the body of the plunger the side walls flare out and are shaped to provide a concave contact receiving and securing seat 154 within which the contact 128 is securely fastened as by welding or the like. The channel shape configuration of the plunger body gives good resistance to axial and torsional loads. If desired, the plunger side walls may be pinched together and spot welded at one or more points throughout its length to increase rigidity.

This design for the plunger permits very inexpensive fabrication and yet results in a plunger which is highly rigid and will accurately transmit variations in the workpiece to the lever assembly within the head. It will be noted that the plunger extends downwardly through the hollow interior of the head into and through the barrel with its lower extremity comprising a contact which projects below the barrel and cooperates with a caliper means to ride a workpiece to sense variations in a dimension of the workpiece.

It is necessary, because of the configuration of the plunger, to prevent its rotation to avoid disturbing accuracy of the measuring function. This is accomplished by a guide lever or link connected to the upper end of the plunger. It is also necessary to insure sensing extremely small increments of vertical travel of the plunger. Preferably the function of guiding the upper end of the plunger in its vertical travel and preventing any tendency to rotate, should be separated from the function of sensing vertical movement of the plunger. The first class lever means 126 disclosed herein satisfies these requirements in that it includes a pair of independent lever arms, one of which serves to guide the upper end of the plunger during its movement, and the other of which serves to transmit vertical motion of the plunger to the dial indicator actuating finger 122. This lever arm assembly 126 is further arranged so that accidental overtravel of the contact 128 will not damage the dial indicator.

The first of these levers is indicated in FIG. 3 at 156, and is best shown in FIG. 8. It is bifurcated and has a pair of side members 158 and 160 connected by a bridging portion 162 and apertured at 164 to provide limited torsional flexibility. A pair of aligned apertures 166 through the side members receive bearings (not shown) for supporting the pivot pin 132 in the lever arm 160. The ears 136 and 138 at the upper end of the plunger are provided with aligned openings slightly undersize the diameter of pin 132 with the ears being provided with slots opening from the apertures to an edge of the ears. The apertures and slots are referred to generally by the numerals 170 and 172 and are shown in FIG. 13. The pin 132 is received through the apertures 166 in the lever 156 and is also press fitted through the apertures in the upper end of the plunger, with the slots of the ears of the plunger allowing the apertures to expand sufficiently to allow reception of the pin and yet to tightly retain the pin in the apertures. This arrangement will prevent rotation of the plunger about its axis relative to the lever.

The lever 156 is mounted on a pin 134 which is in turn carried by a works bracket 174. Pin 134 is received through slotted apertures 176 in the works bracket, which apertures are similar to those in the upper end of the plunger in that they are undersize slightly the diameter of pin 134 so that when the pin is pressed through them they tightly grip the pin. The side walls 158 and 160 of the lever embrace and overlie opposite side walls 178 and 180 of the works bracket as shown in FIGS. 2, 3 and 5 with the forward ends 158′ and 160′ adapted to serve as limiting stops for the movement of the plunger 34. For such purpose they underlie projecting fingers 182 and 184 of a U-shaped stop member 186 shown in FIG. 9. The stop member is provided with a pair of aligned threaded holes 188 and 190 through which is threadedly received a screw 192 provided with a knurled head 194. The shank of the screw is a slip fit through an aperture 196 in an upper face of the works bracket with the underside of the knurled head riding such face of the bracket. The lower end of the screw is provided with an annular notch 197 which is received within a U-shaped cut-out 198 in a fixture 200.

The fixture is provided with opposed arms shaped as shown in FIG. 9, the lower ends of which are inturned toward each other as at 201 and are adapted to embrace and underlie a tang 202 punched inwardly from the front face plate 204 of the works bracket. Upon rotation of the screw 192 in one direction or the other the stop 186 may be vertically shifted to vary the position of the fingers 182 and 184 and thereby determining the downward movement or downward limit of travel of the plunger 34 and in turn the contact 128.

The plunger is urged normally downwardly by a spring 206 having an end 208 which overlies pin 132 with its other end being spiral wound and terminating in a radially extending part 210 which is received in a groove 212 formed in hub 214. The hub is provided in the end face at end 216 with a hexagonal socket (not shown) for reception of an Allen wrench which may be inserted in the socket when the hub is in the works bracket by extending the wrench through opening 218 of the bracket. The opposite end of the hub is provided with a threaded bore 220 for reception of a screw member 222 whose head overlies wall 178 of the bracket and whose shank extends through aperture 224 and into bore 220.

With the spring 206 mounted on the hub and seated in the bracket with the screw 222 extending through aperture 224 and loosely engaged in the threaded bore 220, and with the end 208 of the spring overlying 132, the tension of the spring against the pin and consequently the force exerted against the workpiece by the contact 128 may be adjusted by turning an Allen wrench in the provided socket and thereafter locking the hub in its adjusted position by tightening the screw 222, thereby drawing the hub tightly against the inside face of wall 178.

Journaled within the works bracket between walls 178 and 180 and on pin 134 is the second lever 226 which comprises a pair of spaced apart wall members 228 and 230 connected together at one end by a bridging portion 232 with the opposite end connected by inturned portions defining rearwardly extending ears that are juxtaposed and welded together to provide a lug 234 which underlies and bears against pin 132. The bridging portion 232 of the lever underlies and bears against the lower end of the actuating finger 122 with the bridge being disposed substantially perpendicular to the path of vertical travel of the finger. The finger 122 of the dial indicator is spring-tensioned by a spring within the indicator (not shown) which constantly urges the finger toward bridging portion 232 and maintains the lug 234 of the lever in contact against the underside of the pin 132. In this fashion the actuating finger of the dial indicator is connected by a first class lever to the upper end of the plunger, the connection obviously being such that fidelity of indicator response to vertical shifting of the plunger will be substantially independent of machining inaccuracies in the lever system.

The works bracket 174 may be formed of a single piece of sheet metal bent to the configuration shown in FIG. 8. The upper face of the bracket defined by wall 236 extends between and connects rigidly the upper ends of side walls 178 and 180 holding them in determined spaced relation. Such side walls are provided with upwardly and outwardly extending portions 238 and 240 which are integral with the top wall 236 and the side walls. Extensions 238 and 240 may be provided with screw thread receiving apertures for the reception of screws 244 received through holes 246 in side walls 48 and 50 of the head 44.

In order to facilitate tensioning of spring 206 after the works bracket levers and the remainder of the lever assembly is assembled in the head of the gauge, a pair of apertures, only one of which is shown in FIG. 12 at 248, are provided in opposite walls 48 and 50 of the head. The screw 222 is accessible through the aperture 248 in wall 50 while the opposite end of the hub is accessible through the corresponding aperture in wall 48 of the head.

The upper wall 236 of the works bracket may be curved upwardly as at 250 to close the front of the gauge beneath the mounting means for the dial indicator. Such wall may be provided with a large aperture 252 for reception of an elastic grommet 254 through which the cylindrical extension 124 of the indicator extends, the grommet serving to prevent the entry of foreign matter into the interior of the head.

The lower end of the works bracket is deformed inwardly and brought together and welded as at 256 to rigidify the lower end of the bracket. The levers, spring and related assembly may be mounted in the bracket and thereafter the bracket and the plunger depending from pin 132 may be inserted into the head of the gauge, the contact 128 passed through its bearing 130 and the works bracket thereupon secured by the screws 244 in the head of the gauge. The dial indicator and its mounting means may be thereafter secured in place.

The barrel 46 is of a tubular construction which is flattened in cross section so that throughout the major portion of its length it has a configuration as shown in FIG. 6. Being flattened throughout its length it provides a relatively narrow profile when viewed from the front. Being tubular it is of stable strength and minimum weight and bulk. By providing a vertically extending upper portion 46″ connected by a downwardly angularly extending intermediate portion 46‴ and terminating in a downwardly extending substantially vertical portion 46′ which is generally parallel the upper portion 46″, the barrel may be formed in various lengths with a minimum of tooling cost as length can be achieved by extending either the upper or the lower portions of the barrel while the angularly extending portion 46‴ remains constant. The geometry would also remain the same even though the barrel is of a greater length and therefore no change need be made in the head assembly should barrels of different length be made up by a manufacturer.

The caliper means at the lower end of the barrel includes a flat somewhat C-shaped plate 260 with the contact 32 being mounted on the lower inside edge thereof and with another contact 33 being mounted at substantially 90 degrees from contact 32. The plate has an upward extension 262 which projects into a downwardly opening socket 264 defined by the front edge wall 82 of the barrel and a triangularly shaped boot 266 having a front wall 268 and opposed parallel side walls 270 and 272. Side walls 270 and 272 are spaced apart only sufficiently to allow a close slip fit of the upper portion 262 of the caliper plate therebetween, with the upper edge of the caliper plate being beveled to complement the angle of the inner surface of the front wall 268 of the boot. With this construction, upward urging of the plate will serve to wedge it securely within the socket 264.

The caliper plate 260 is provided with an ear 274 having a downwardly and forwardly facing beveled locking surface 276 and a rearwardly facing surface 277 which fits a vertical slot 278 formed in a bushing 279 welded to the front edge wall 82 at the lower end of the barrel. The caliper plate is locked in wedging tension against the barrel and upwardly within the socket by clamping means which includes a screw 280 extending downwardly through the bushing and threadedly engaging a clamp plate 281 having a beveled surface complementing the surface 276 and bearing thereagainst and also having at its rearward end a key 282 received in a provided opening in the lower end wall 283 of the barrel adjacent bearing 130. By loosening the screw it is apparent that the caliper plate may be removed and this may be accomplished without completely disengaging the screw from the clamping plate.

At the lower extremity of the barrel the wall 283 closes the lower end to prevent entry of foreign matter thereinto. The bearing 130 is rigidly secured in the lower end of the barrel in any suitable fashion.

As it is desirable to maintain contact 128 as close to the rear edge 298 of the barrel as possible and yet avoid wiping contact with the barrel walls, the plunger is relieved as at 300 and the cylindrical contact 128 flattened as at 302 to allow vertical travel without interfering with the rear edge 298 of the barrel.

It will be understood in view of the foregoing description that the first class lever 156 acts like a link having parallel axes of pivotal connection with the plunger and works bracket to guide the upper end of plunger 34 and prevent any rotation thereof about its vertical axis. The plunger 34 is supported in the gauge only by its cylindrical lower end and the pivotal link or lever arrangement 156. Such mounting of the plunger gives rise to extremely smooth low friction non-drag operation. The connection between the dial indicator finger 122 and the bridging portion 232 of lever 226, as well as the connection between the lug 234 of lever 226 and the pin 132 at the upper end of the plunger may be characterized as disconnected couplings as "overtravel" of the plunger upwardly will simply serve to shift the bridging portion downwardly away from the finger 122 so that engagement therebetween is broken and lever 226 is at this point free to pivot unhindered either by finger 122 or pin 132. Lug 234 of lever 226 is held against the underside of pin 132 by the downward bias of the spring in the dial indicator 40 urging the finger 122 downwardly against the bridging portion 232 of the lever. The tension of spring 206, being greater than the downward bias on finger 122, serves to keep the plunger 34 constantly against the workpiece overcoming the bias downwardly against finger 122. By adjustment of screw 194 the amount of upward movement of finger 122 by downward movement of plunger 34 may be variably limited.

In FIGS. 14 and 15 there is shown a modified construction of a dial indicator actuating mechanism which may be utilized in lieu of the assembly generally indicated by numeral 126 in FIG. 3. Such actuating mechanism, which is shown generally at 310 in FIG. 14, is of a simple construction and is easily fabricated. The works bracket 174 shown in FIGS. 14 and 15 is identical to that shown at 174 in the previous figures. The other parts shown in FIGS. 14 and 15 which are identified by the same numerals as heretofore used are identical in construction to parts previously described.

The actuating mechanism 310 comprises a lever member 312 of the first order, having a front end 314 and a bifurcated rear end defined by side portions 316 and 318. Front end 314 is provided with a flat upper surface 320 which contacts the reciprocable actuating finger 122 of the dial indicator 40. As shown in FIG. 15, lever 312 is formed in two pieces disposed in allochiral relation and welded together as at 322 to provide a rigid unitary member. The lever 312 is apertured at 324 for pivotal mounting on a pin 326 which extends through the lever and is supported at opposite ends within the slotted apertures 176 in works bracket 174. The walls of aperture 324 serve as a bearing for pivot pin 326, and at opposite ends thereof and aperture 324 is slightly bellmouthed. Each side portion 316 and 318 are additionally provided with a forwardly projecting shank, one of which is shown at 327, the front edge of which abuts pin 326.

Encircling pin 326 intermediate lever 312 and the opposite side walls of the works bracket 174 are a pair of bearings 328 and 330. The purpose for this particular construction will be described more fully hereinafter.

The side portions 316 and 318 of lever 312 are provided with aligned apertures 332 and 334 to receive opposite ends of a pivot pin 336, which is also press-fitted through the slotted apertures in the upper end of the plunger 34, which is identical in construction to that previously described. Intermediate aperture 324 and the pair of apertures 332 and 334, there is provided an additional pair of apertures 338 and 340 in sides 316 and 318 respectively of lever 312. A connecting member 342 of generally T-shape is provided with opposite projecting ends of its head rotatably engaged within the apertures 338 and 340. A spring 344 having one end spirally wound and terminating in a radially projecting end 346 is received in a groove 212 formed in hub 214, which construction is identical to that heretofore described for spring 206. The opposite end 348 of spring 344 extends toward the upper end of plunger 34 generally underneath lever 312 and has an aperture 350 through which projects the lower end of member 342, which is bent into a tang 352 overlying the spring to keep the parts together. With the parts assembled as shown in FIG. 14, spring 344 acts through member 342 to tension the rear end 316, 318 of lever 312 downwardly, which in turn urges plunger 34 downwardly by means of its connection thereto at 336. As the plunger 34 shifts vertically, the movement is transmitted through lever 312 and thence to the actuating finger 122 of the indicator 40.

Because of manufacturing tolerances, fabricational errors, etc., it frequently happens that some slight misalignment can at times occur among the various moving parts above described. To accommodate for such misalignment and still ensure accuracy of measurement, aperture 324 is slightly bellmouthed at opposite ends, permitting the lever 312 to wobble slightly on its fulcrum pin 326 without binding on the pin. Thus the position of the plunger 34 controls the attitude of pin 336 and also the mating bearings 332 and 334 of lever 312, and slight misalignment of the plunger can be tolerated without binding lever bearing 324 on its stationary pin 326. Sleeves 328 and 330 serve to hold lever 312 centrally with respect to the works bracket 174. This construction permits free movement of the plunger 34 even if the plunger and lever are not in perfect alignment.

While the bearing structure above described serves to limit the plunger movement in one direction, there is also a tendency for the plunger to rotate about its longitudinal axis. As mentioned above, each of the side portions 316 and 318 of lever 312 have a forwardly projecting shank or arm 327, one of which is shown in FIG. 15 and the other of which is shown in dotted outline in FIG. 14. These two shanks are positioned with their leading edges almost in abutment with opposite projecting ends of pin 326. With very slight movement of the lever 312 in a horizontal plane, one of the shanks 327 abuts pin 326, preventing further movement or wobble of the lever, and at the same time preventing rotation of plunger 34 about its major axis. As will also be seen from an examination of FIG. 14, spring 344 is coupled to the lever 312 through the member 342, and the points of connection to the lever, at 338 and 340, are spaced apart on opposite sides of the bearing connection between the lever and pin 326. Hence, the spring bias on the lever acts thereagainst to retain the lever in an aligned position with the plunger against any tendency to movement because of the working clearances between the lever bearings and their respective pivot pins. The force vector of spring 344 is applied to the lever 312 through member 342 substantially centrally between the bearings 338 and 340, and thus the spring force acts on the lever within the triangle formed by bearings 324, 332 and 334. This construction insures uniform and consistent spring bias on the lever 312 and therefore perfect repetitive coordination between the plunger 34 and the actuating finger 122 of the dial indicator 40.

It will be noted that each of the apertures 324, 332 and 334 on lever 312, which provide bearing surfaces for the pivot pins 326 and 336, are provided with undercuts or relief slots 354 disposed substantially at the load radial thrust vector. The opposite edges of each undercut always remain in contact with the pivot pin due to the opposed forces between the plunger and lever. Vacillation of the pivot pins within the bearing apertures in the lever is thus effectively prevented, insuring consistency in the relative displacements of opposite ends of the lever 312.

What is claimed is:
1. A relatively lightweight upright grinding gauge comprising, in combination: a sheet metal body including a head at the upper end and caliper means at the lower end connected together by a tubular barrel of flattened cross-sectional shape providing a relatively narrow front profile, said barrel having an upper portion adjacent the head offset toward the front and a lower portion adjacent the caliper means offset toward the rear with said portions being generally parallel and connected by a diagonally extending intermediate portion, a dial indicator mounted on the top of the head on the opposite side from the barrel and facing the front and angularly upwardly and having an actuating finger disposed within the head, a movable pin contact supported for closely guided axial reciprocation in the lower end of the barrel adjacent the caliper means, first class lever means mounted in the head having one end cooperable with said finger, and a sheet metal plunger of channel-shaped cross-section extending through the barrel spaced from the inner wall surfaces thereof and connected at the lower end to said contact to be guided and shifted thereby and pivotally connected at the upper end to the opposite end of said lever means to be guided thereby and pivot the lever means to actuate said finger upon movement of the contact pin.

2. An upright grinding gauge comprising, in combination: a gauge body having a hollow head at the upper end and a tubular barrel connected to the lower side of the head and extending downwardly therefrom; a dial indicator mounted on the head having an actuating finger whose lower end is disposed in the interior of the head, a spring biased first class lever mounted in the head with one end underlying the lower end of the pin and biased to raise the pin and actuate the dial indicator, a plunger operatively connected to the opposite end of the lever and extending downwardly through the barrel and shiftable upwardly counter said spring bias of the lever to allow lowering of said finger, and the lower end of the plunger terminating in a contact pin projecting downwardly from the lower end of the barrel and supported therein for closely guided reciprocation along a path disposed substantially directly in line with the connection between the upper end of the plunger and lever.

3. An upright grinding gauge comprising, in combination: a gauge body, a dial indicator mounted on the upper end of the body and provided with a depending actuating finger, a first class lever mounted on the body adjacent the indicator with one end of the lever operatively underlying the lower end of the finger and the opposite end of the lever extending rearwardly of the indicator, said gauge body extending downwardly below the indicator with the lower end portion of the body being offset rearwardly and provided with a rearwardly opening workpiece caliper, a plunger operably connected at its upper end to the opposite end of the lever and terminating at its lower end in a workpiece contact pin cooperable with a workpiece embraced by the caliper, said pin supported by the body for axially shiftable movement in response to variations in dimension of the workpiece along a path substantially aligned with the connection between the upper end of the plunger and the lever.

4. A gauge barrel and caliper assembly for an upright grinding gauge comprising: an upright elongated tubular sheet metal barrel of generally flattened cross section providing opposed substantially parallel flat sides connected by opposed relatively narrow front and rear edge walls, a downwardly opening socket adjacent the lower end of the barrel at the front edge wall but spaced upwardly from the lower extremity of the barrel and having converging internal wedge walls facing downwardly to limit upward movement of a caliper portion received in the socket, caliper means connected to the lower end of the barrel and including a flat C-shaped plate member having a first portion projecting upwardly into said socket and bearing against the wedge walls and a second portion defining a downwardly and forwardly facing wedging surface, and clamping means on the barrel abutting said wedging surface to tension said caliper means upwardly into the socket and rearwardly against the barrel.

5. An upright grinding gauge comprising, in combination: a gauge body having a hollow head at the upper end and a hollow elongated barrel extending downwardly therefrom and provided at its lower end with a workpiece caliper, a dial indicator mounted on the head with an actuating finger disposed in the head, a plunger extending through the barrel with the lower end providing a cylindrical workpiece contacting part disposed to engage at its lower extremity a workpiece embraced by the caliper, a bearing in the lower end of the barrel through which said contacting part extends whereby the lower end of the plunger is guided for reciprocation, first class lever means pivotally mounted in the head with one portion engaging said finger and another portion comprising a link connected to the upper end of the plunger guiding the same for reciprocation parallel to the contacting part and preventing rotation of the plunger about its principal axis, said lever means transmitting reciprocation of the plunger to said finger.

6. The invention as defined in claim 5 characterized in that said one portion of the lever means is operatively independent of the portion comprising the link and at one end engages the actuating finger of the dial indicator and at the other end is disconnectably coupled to the upper end of the plunger.

7. The invention as defined in claim 6 characterized in that stop means are provided in the head cooperable with the link to limit movement thereof in one direction.

8. An upright grinding gauge comprising, in combination: a gauge body having a hollow head at the upper end and a hollow elongated barrel extending downwardly therefrom and provided at its lower end with a workpiece caliper, a dial indicator mounted on the head with an actuating finger disposed in the head, a plunger extending through the barrel with the lower end providing a cylindrical workpiece contacting part disposed to engage at its lower extremity a workpiece embraced by the caliper, a bearing in the lower end of the barrel through which said contacting part extends whereby the lower end of the plunger is guided for reciprocation, a first, first class lever pivotally mounted in the head with one end pivotally coupled to the upper end of the plunger to guide the same for reciprocation and with the opposite end positioned to engage a stop member for limiting movement of the plunger downwardly in the barrel, a second first class lever pivotally mounted in the head on an axis coincident with the pivotal axis of the first lever and having one end engaging the finger to shift the same and the opposite end disconnectedly coupled with the upper end of the plunger.

9. The invention as defined in claim 8 characterized in that the point of coupling of the second lever to the upper end of the plunger is at the connection of the first level and the plunger.

10. An upright grinding gauge comprising, in combination: a gauge body having a head at its upper end and an elongate barrel depending therefrom and offset rearwardly at its lower end, a dial indicator mounted on the head and having an actuating finger in the head, a plunger extending downwardly through the barrel and provided with a cylindrical portion adjacent its lower end and a workpiece contacting face, bearing means on the barrel encircling the cylindrical portion to support the lower end of the plunger for reciprocation, said plunger jogging rearwardly along its length to accommodate the rearward offset of the barrel and having an upper end disposed in the head of the gauge substantially in alignment with said cylindrical portion and of increased width relative to its mean width in the barrel, link means pivotally mounted in the head having relatively rigid arms embracing the upper end of the plunger and pivotally connected thereto in substantial alignment with the path of reciprocal movement of the lower end of the plunger and preventing rotation of the plunger, and a first class lever mounted in the head and connected at one end to the plunger and at the opposite end to the dial indicator actuating finger to transmit reciprocation of the plunger to the finger.

11. In an upright grinding gauge having a vertically extending elongated hollow body, a dial indicator mounted upon the upper end of the body with a depending downwardly biased actuating finger, a rigid plunger extending through the body and projecting below the lower end thereof to engage a workpiece and supported at its upper end for vertical movement in response to like movement of its lower end, spring means cooperating with the plunger biasing the same downwardly, stop means cooperating with the plunger limiting downward movement thereof, and a first class lever pivotally mounted in the body with one end underlying said finger and disconnectably coupled thereto to raise the same counter the downward bias of the finger and the other end disconnectedly coupled to the plunger to follow upward movement thereof under the influence of the downward bias of said finger.

12. An upright grinding gauge comprising, in combination: a gauge body having a hollow head at its upper end and an elongated barrel depending from the head, a dial indicator mounted upon the head and provided with an actuating finger disposed within the head, a works bracket mounted in the head and pivotally supporting first lever means comprising a first class lever one end of which engages said finger of the dial indicator and the other end of which engages said plunger, second lever means pivotally mounted on said works bracket and connected to the upper end of the plunger to guide the same for reciprocation, spring means mounted on the works bracket and coupled with the plunger to bias the same downwardly.

13. The invention as defined in claim 12 characterized in that said spring includes a helically wound portion mounted on a hub carried by the works bracket, screw means releasably locking the hub to the works bracket, said hub provided with a tool engaging socket for rotation of the hub, and said head having side walls provided with apertures registering with said screw means and tool socket permitting adjustment of the spring tension from outside the head.

14. The invention as defined in claim 12 characterized in that said works bracket is provided with a screw threaded adjustable stop, and said second lever means is provided with a portion adapted to abut said stop and limit downward movement of said plunger.

15. An upright grinding gauge comprising, in combination: a gauge body having a head at the upper end and a tubular barrel extending downwardly therefrom, a dial indicator mounted on the head and provided with an actuating finger, a plunger extending through the barrel with the lower end adapted to engage a workpiece, a link pivotally mounted on the head and pivotally connected to the upper end of the plunger to support and guide the same for vertical movement and prevent rotation of the plunger about its principal axis, spring means on the body operatively connected to the plunger biasing the same downwardly, and a first class lever pivotally mounted on the head and operatively independent of said link with one end engaging said finger and the opposite end engaging said plunger to transmit vertical movement of the plunger to said finger.

16. The invention as defined in claim 15 characterized in that said link comprises a first class lever one end of which is connected to the plunger as aforesaid, and stop means mounted on the head to abut the opposite end of said lever to limit upward movement of such end of the lever.

17. The invention as defined in claim 15 characterized in that the axis of pivotal mounting of the link on the head is coincident with the axis of pivotal mounting of the lever on the head.

18. The invention as defined in claim 15 characterized in that the distance between said finger and axis of pivotal mounting of the lever on the head is equal to the distance between such axis and the pivotal connection of the lever and plunger.

19. In an upright grinding gauge: a gauge body having a hollow dial indicator mounting head, a dial indicator mounted on said head having a depending downwardly biased actuating finger, a hollow tubular barrel rigidly connected to and extending downwardly from the head, caliper means at the lower end of the barrel for embracing a workpiece, an elongated plunger extending through the barrel and supported at its lower end for reciprocatory cooperation with a workpiece embraced by the caliper means, a first class lever member supported in the head for cooperation at one end with a said dial indicator actuating finger mounted on the head and pivotally connected at its opposite end with the upper end of the plunger to support the latter for reciprocation and transmit reciprocatory movements of the plunger to the dial indicator, and spring biasing means supported in the head and coupled to said lever member for biasing the lever in a direction urging the plunger downwardly within the barrel.

20. The invention as defined in claim 19 characterized in that said lever member is pivotally supported in said head intermediate opposite ends of its length on a pivot pin, with the bearing surface disposed substantially centrally along the pin axis, and the bearing being bellmouthed at its opposite ends to permit limited rockable movement of the lever member with respect to the pin.

21. The invention as defined in claim 20 characterized in that said lever is pivotally supported on said pivot pin substantially equidistant from its point of cooperation with the dial indicator and its connection with the plunger, and said spring biasing means is coupled to said lever member intermediate said pivot pin and said connection with the plunger.

22. The invention as defined in claim 20 characterized in that a works bracket is mounted in said head supporting said pivot pin on opposite sides of said lever member and spaced therefrom, and sleeve means are provided encircling said pivot pin on opposite sides of said lever member for abutment therewith to limit rockable movement of the lever member with respect to said pin in a vertical plane.

23. The invention as defined in claim 22 characterized in that said pivot pin has opposite ends projecting beyond said works bracket, and said lever member includes a pair of spaced apart generally horizontal arms adapted to abut said pin adjacent its opposite ends to limit rockable movement of said lever member with respect to said pin in a horizontal plane.

24. The invention as defined in claim 19 characterized in that said first class lever is pivotally supported in said head and is pivotally connected to said plunger, one of said pivots having two spaced apart, axially aligned bearings, and the other of said pivots having a single, relatively narrow bearing generally at the longitudinal centerline of the lever, permitting said rockable movement of the lever with respect to the pivot, and abutment means for limiting the rockable movement of said lever with respect to said other pivot.

25. A gauge body for an upright grinding gauge comprising: an upright elongated tubular sheet metal barrel of flattened cross-section providing a relatively thin front-to-rear profile, said barrel having generally vertically extending parallel upper and lower portions and a connecting intermediate portion, said upper portion being offset toward the front and said lower portion being offset toward the rear with the intermediate portion extending diagonally therebetween, caliper means connected to the lower end of the barrel, a hollow sheet metal head telescopically, rigidly connected to the barrel upper portion, dial indicator mounting means at the top of the head on the side thereof opposite the barrel, said head interiorly communicating with the interior of the barrel for reception of dial indicator actuating mechanism extending from said caliper means at the lower end of the barrel to a dial indicator on said mounting means at the top of the head.

References Cited

UNITED STATES PATENTS

| 1,290,434 | 1/1919 | Walter | 33—172 X |
| 1,768,931 | 7/1930 | Pratt | 33—147 X |
| 1,890,827 | 12/1932 | Pratt | 33—147 |
| 1,941,456 | 1/1934 | Arnold | 33—172 |
| 2,000,057 | 5/1935 | Arnold | 33—147 |
| 2,249,904 | 7/1941 | Lewis | 33—178 |
| 2,602,235 | 7/1952 | Dow | 33—172 |

SAMUEL S. MATTHEWS, *Primary Examiner.*